J. W. SCOTT.
PROCESS FOR PRODUCING SOLUBLE CONCENTRATED COFFEE.
APPLICATION FILED SEPT. 24, 1918.

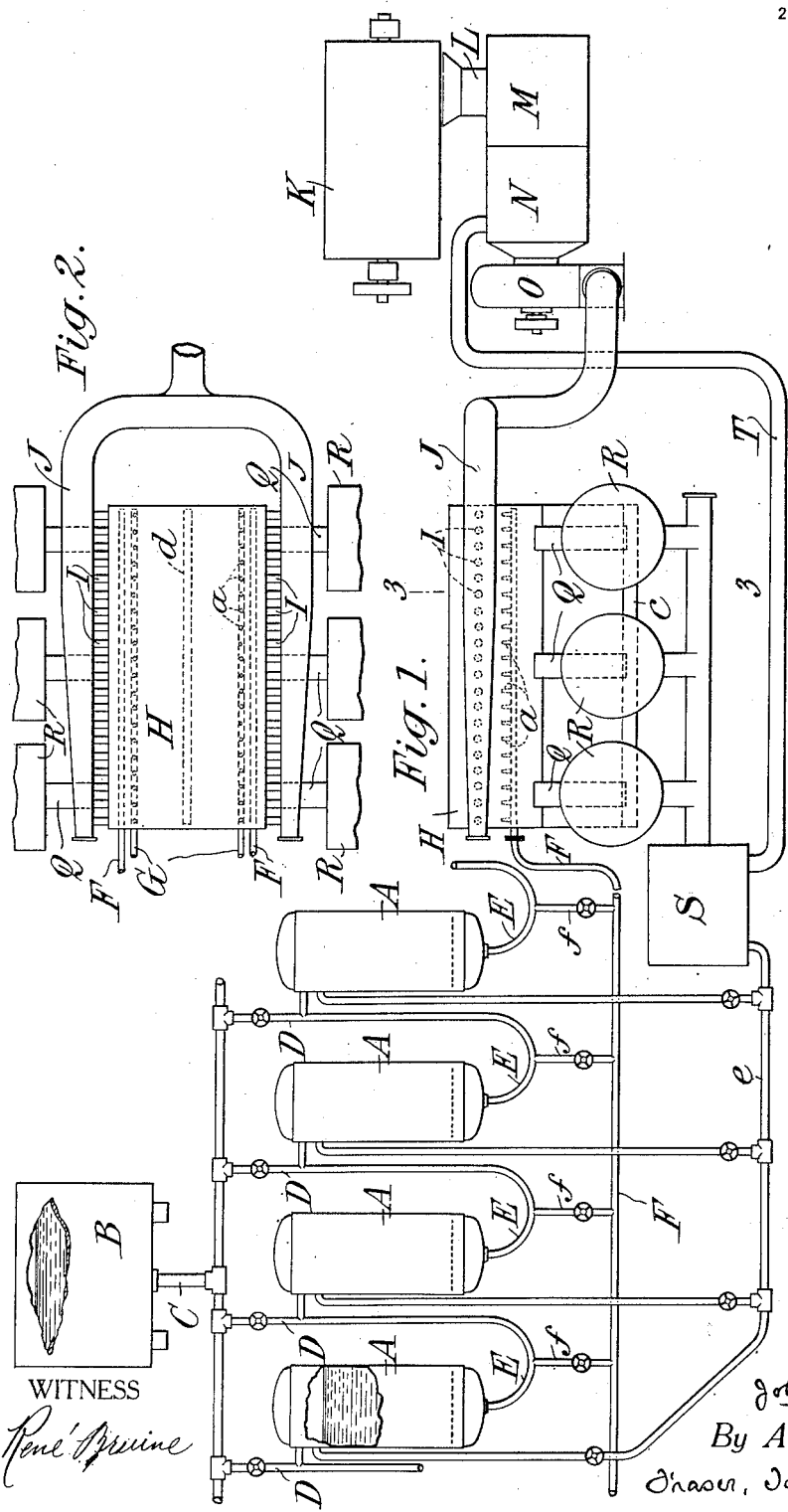

1,393,045.

Patented Oct. 11, 1921.

WITNESS:
Rene Bruine

INVENTOR
John W. Scott.
By Attorneys,
Fraser, Dunk & Myers

UNITED STATES PATENT OFFICE.

JOHN W. SCOTT, OF ENGLEWOOD, NEW JERSEY, ASSIGNOR TO ARBUCKLE BROTHERS, OF NEW YORK, N. Y., A FIRM COMPOSED OF WILLIAM A. JAMISON, CATHERINE A. JAMISON, AND CHRISTINA ARBUCKLE.

PROCESS FOR PRODUCING SOLUBLE CONCENTRATED COFFEE.

1,393,045.  Specification of Letters Patent.  Patented Oct. 11, 1921.

Application filed September 24, 1918. Serial No. 255,509.

*To all whom it may concern:*

Be it known that I, JOHN W. SCOTT, a citizen of the United States of America, residing in Englewood, in the county of Bergen and State of New Jersey, have invented certain new and useful Improvements in Processes for Producing Soluble Concentrated Coffee, of which the following is a specification.

My invention relates to a process for producing soluble concentrated coffee, and has particular application to obtaining a coffee extract which can be used by merely dissolving within a liquid, and retains a large part of the aroma and desirable oils and products which are usually lost in the roasting and cooking processes.

It has been extremely difficult to secure an extract or concentrate of coffee, owing to the necessity of applying heat in the different stages of the operation, and the consequent loss of volatile oils which are an important factor in the desirable properties of the product when used, and a particular purpose of the invention has been to carry out the desiccating operation of the coffee liquor under conditions that will insure a retention of nearly all of its original aroma.

Another purpose of the method is to subject the mass of ground coffee, to a diffusion process, under such conditions and steps as will result in imparting to the liquor a maximum strength for a given mass to start with, and holding within the liquor as much as possible of the highly desirable oils and aromatic properties, which are so likely to be readily separated from the diffused liquid.

Another purpose of the invention resides in enriching the final concentrate, and at the same time economizing in the amount of coffee required, by utilizing the by-products and heretofore wasted products of the coffee-roasting operation. When coffee is roasted, a considerable portion of the aroma and desirable oils are lost, and it is my purpose to save these, as far as possible, by bringing them into contact with the coffee liquor at the desiccating stage of the process.

Another object contemplated by the invention is to afford a manufactured food article, containing an extract or concentrate of coffee or similar product, and susceptible of immediate use by mixing it with a suitable liquid, heated or otherwise.

A preferred way of carrying out the method consists first in the utilization of a series of vessels or tanks containing the ground coffee. The coffee liquor is made by supplying water to said vessels in succession, by percolating either upwardly or downwardly, the water preferably having an initial temperature at approximately, or very nearly, boiling point, and passing first to the tank which contains the weakest, or spent, mass. While in the first vessel or vessels, the liquor is permitted to cool to a point considerably below boiling, preferably about 110° F., and is preferably maintained at such temperature during its progress through the succeeding vessels. The liquor finally percolates the strongest, freshest mass, at a temperature sufficiently reduced to retain the maximum aroma. The strong aromatic extract thus produced is carried to a concentrating apparatus or desiccator, where it is atomized by a jet of compressed air, or other fluid, and discharged into the path of a blast of highly heated air, which acts quickly to evaporate the liquid contents and to cause a partial or complete drying of the solids, as desired.

The hot blast into which the liquor is atomized, is preferably at a high enough temperature to effect complete desiccation, in the case of coffee, with such suddenness as to prevent escape of the natural aroma, the volatile products of the coffee being held within the solidified product. This action is assisted, or supplemented, by introducing into the hot blast the desirable volatile products from a coffee roasting machine, the aromatic and other oils being taken from the latter and carried first through a purifying or washing apparatus, thence to a heater and thereafter mixed with the hot blast already mentioned. The larger part of the desiccated product is carried by gravity to the bottom of the desiccating apparatus, whence it is discharged by a suitable mechainsm for the purpose. Some of the solid matter, however, will be carried away with the discharged air, and it is desirable to save as much of this matter as possible. To accomplish this, the outgoing air is subjected to the action of one or more dust collectors or extractors, to separate the remaining dust or extract which was not previously carried to the bottom of the desiccating apparatus. After separating the dust, the air, which may still carry some concentrate, is carried to a washer, resulting in a more or less weak solution of liquor, which is preferably returned to the diffusion apparatus and there combined with the main body of liquor, by being introduced into one or the other of the series of vessels, according to the strength of the returned solution, as it is desirable that it be mixed with the liquor in the diffusion system at a point where it will be of approximately the same strength as the solution with which it combines.

To these and other ends, the invention consists in certain other details and steps as will be hereinafter more fully described and pointed out in the claims at the end of the specification.

In the drawings:

Figure 1 is a diagrammatic side elevation illustrating a preferred arrangement of units for carrying the improved method into practice;

Fig. 2 is a plan view of the desiccating apparatus;

Figure 3:
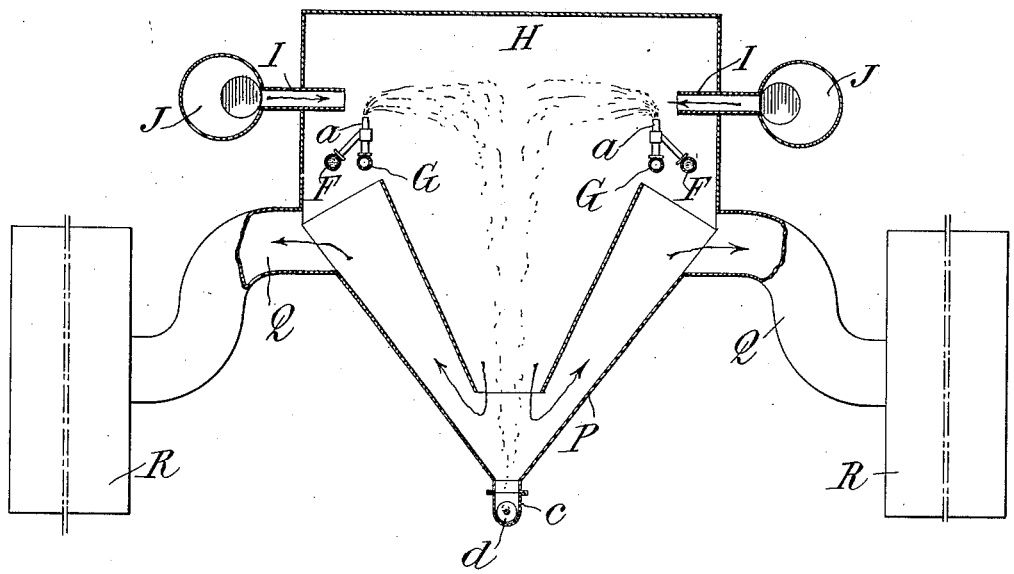
Fig. 3 is a transverse vertical sectional view of the same, on a larger scale, on line 3—3 of Fig. 1.
Figure 4:
Fig. 4 is a detail view of the manufactured product.

There are, of course, various ways, and different types of apparatus, which enable practical use to be made of the invention, and the process is not confined to any one particular adaptation. As an illustration of one possible arrangement, I have shown the mechanism intended for the preparation of a concentrated coffee, which may, as a final product, take the form of a powdered or granular mass, or that of a syrup or heavy liquid. In carrying out the method the coffee is first ground and placed in a series of vessels or tanks A, which are supplied with water from a reservoir B, communicating through main pipe C, branch pipes D, and connecting pipes E, between the respective tanks, although the water may percolate upwardly. Water from the reservoir B preferably passes first to the end tank of the series, and then successively through the several tanks, and as the operation proceeds, I prefer to have the coffee of least strength, or that which is practically spent, in the first tank which the water reaches, and the ground coffee mass in the succeeding tanks of constantly increasing strength. The water may be heated in any usual way, and is preferably held initially at a temperature approximating the boiling point, or very nearly boiling, which degree of heat is retained as the water passes through one or two vessels. It cools gradually, and, according to a very successful manner of operating, good results are obtained by permitting the liquor to decrease in temperature to a point considerably below boiling, while in the first vessel of the series. Preferably, in cooling, it reaches a temperature of about 110° F., which continues during its subsequent travel through the different vessels.

After passing from the last vessel in use, of the series of the diffusion apparatus, the liquor enters the desiccating apparatus, through a pipe F, which is connected independently with each vessel by a branch $f$, and is there discharged through a series of nozzles $a$, in the form of fine spray, being atomized by means of jets of compressed air, or other fluid, from a suitable source of supply, through the pipe G. The desiccating apparatus comprises, generally, a casing or housing H, having oppositely disposed inlets I, somewhat above the nozzles $a$, and preferably extending in a horizontal direction, while the said nozzles are directed vertically. The air inlets I may also be directed upwardly or downwardly, either vertically or at any angle of inclination. The nozzles $a$ may also be directed horizontally or downwardly, and at any angle of inclination upwardly or downwardly, either with reference to the horizontal, or to the direction of the stream of air. The inlets I communicate with conduits J, containing a supply of highly heated air under pressure which is discharged through the inlets I, toward the center of the housing H. This arrangement affords a blast of hot air into which the coffee liquor is atomized, and by which it may be brought to a state of complete desiccation with great rapidity. It is not essential, however, that the product be entirely dried, as the extract may be a heavy syrup or liquid, depending upon the use to which it is to be put, and it will be understood that the degree of heat of the air blast may be varied to suit such different requirements.

If the air blast, into which the atomized liquor is discharged, is sufficiently hot, desiccation of the solid contents of the liquor will take place almost instantaneously, and with sufficient rapidity to retain within the solid mass the aroma and desirable rich oils of the coffee. A well-recognized obstacle to the successful extraction of coffee, or any preparation of coffee for instant use, is the loss of its original aroma, and, while the method already described overcomes this in large measure, I have discovered that the defect can be further remedied by having the hot blast, into which the liquor is atomized, surcharged with an abundance of the aroma and desirable oils of coffee. This can be accomplished in an extremely economical way by associating the diffusion and desiccating apparatus with a coffee roasting machine, in such a way as to utilize what are ordinarily waste products of the roasting process.

In the present mechanism, a conventional type of roaster is designated by K, and from this leads a conduit L to a washer M. The hot air and volatile contents of the roaster are carried to the washer M, where they are purified, and the volatile oils are thence introduced into the heater N, from which they are driven by a fan O into the conduit J aforementioned. The washer M serves to remove any undesirable or solid matters, such as chaff, smoke, and gross oily products, and the result is to provide a drying air blast, which is heavily laden with a rich coffee aroma, and this is largely absorbed and retained by the desiccated or extracted product.

A large proportion of the dried product falls to the bottom of the housing H, into a hopper P, and is carried off through a trough c by a suitable screw-conveyer d. The surplus air is forced out through conduits Q, which lead to dust collectors R. These may be of any conventional form and are intended to collect any of the desiccated product which is not heavy enough to find its way to the bottom of the casing H, or is otherwise carried off by the outgoing air. The air from which the powder is separated is then passed to a washer S, which will separate any remaining solid matter into a more or less weak coffee solution which can be re-introduced to the diffusion apparatus by returning it through pipe e to one of the vessels A, preferably the one in which the solution is of approximately the same strength as that of the returned liquid. The air, after entering the washer S, may be carried through a pipe T to the heater N for utilizing further as part of the air blast.

By this method, the most desirable qualities of the coffee are largely preserved and form a part of the soluble extract or concentrate, and this result is due, in large measure, to the fact that the liquor is diffused while at a comparatively low temperature, preventing vaporization and loss of the aroma, and this result is further assisted by the conditions under which the liquor is finally concentrated, the heated atmosphere serving to effect desiccation instantaneously.

In order to afford a practical way of commercially distributing a coffee concentrate for convenient use, the product, either completely desiccated or in syrupy form, is placed within a container that is preferably both soluble and edible. A convenient substance for this purpose is found in gelatin which may be used in the form of a capsule to contain the coffee extract in granular or other form. When ready for use, the extract-containing capsule can be dropped into a body of liquid suitable for serving, such as sweetened or unsweetened milk, and it is also within the purpose of my invention to have the entire beverage in concentrated form by incorporating with the desiccated coffee a measured quantity of milk, suitably desiccated, and with or without a desirable proportion of sugar or other sweetening medium.

The method may be modified in various ways, so as to differ from the specific arrangement and details which I have described, but without departing, in any sense, from the essential or underlying purpose of my invention, or the intended scope of the following claims.

What I claim is:—

1. The method of producing a coffee concentrate consisting in first producing a coffee extract by percolation under conditions whereby maximum aroma is obtained in the extract, and then atomizing such extract into a highly heated blast to effect instantaneous concentration and retain the aroma in the concentrate.

2. The method of producing a coffee concentrate consisting in supplying a liquid to successive vessels containing ground coffee, the liquid when at its highest temperature permeating the most spent mass of coffee, and passing at a lower temperature to masses of coffee of successively increasing strength, whereby to obtain an extract rich in aroma, and atomizing the liquor thus formed into a highly heated blast to accomplish instantaneous concentration and retain the aroma in the product.

3. The method of producing a coffee concentrate consisting in supplying a liquid to successive vessels containing ground coffee, the liquid permeating initially the most spent coffee when at a temperature slightly below boiling point, and passing at decreasing temperature to coffee of successively increasing strength, the final extraction being at a temperature considerably below boiling point, whereby to retain the maximum aroma, and atomizing the liquor thus formed into a blast of highly heated air, with which concentration is effected instantaneously so as to retain the aroma in the product.

4. A method according to claim 1, characterized by impregnating said highly heated blast with the aromatic and volatile products obtained from coffee roasting.

5. A method according to claim 1, in which the aromatic and volatile products obtained from coffee roasting are first purified, then heated and combined with said highly heated blast.

6. The method according to claim 3, in which the aromatic and volatile products obtained from coffee roasting are first purified, then heated and combined with said blast of highly heated air.

7. A method of producing a coffee concentrate consisting in first producing a coffee extract and then atomizing such extract into a highly heated blast containing aromatic and volatile products obtained from coffee roasting.

8. A method according to claim 2, in which the concentrate carried off by the escaping air is separated, a solution is made therefrom, and such solution is returned to one of the coffee extracting vessels and commingled with the extracting liquor, whereby such otherwise waste concentrate is utilized.

9. A method according to claim 2, in which the desiccated concentrate carried off by the escaping air is dissolved, and the solution thereof is returned to one of the coffee extracting vessels and commingled with the extracting liquor, whereby such otherwise waste concentrate is utilized.

10. A method of producing a coffee concentrate consisting in first producing a coffee extract by percolation through successive vessels, the liquid of successively increasing density permeating first the most spent mass of coffee and successively masses of successively increasing strength, then concentrating such extract by atomizing it into a highly heated blast, recovering the concentrate carried off by the escaping air, dissolving the same, and returning it to that one of the vessels to which is introduced liquor of substantially similar density.

In witness whereof I have hereunto signed my name.

JOHN W. SCOTT.